Sept. 23, 1941.                C. R. RANEY ET AL                 2,256,815
                                MANURE SPREADER
                            Filed March 2, 1939            3 Sheets-Sheet 1

Inventors
C.R. Raney
R.D. MacDonald
By Paul O. Pippel
Atty.

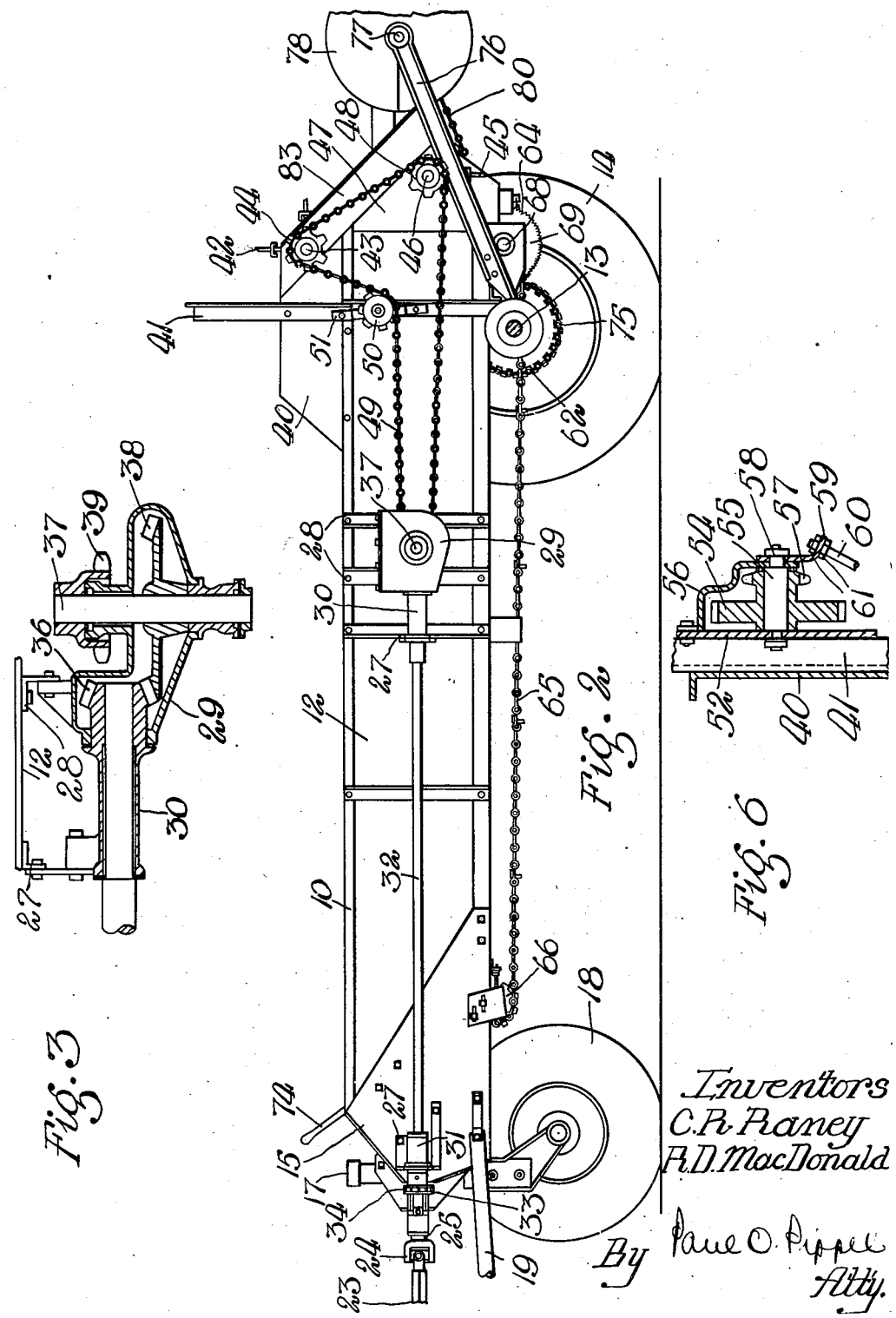

Sept. 23, 1941.   C. R. RANEY ET AL   2,256,815
MANURE SPREADER
Filed March 2, 1939   3 Sheets-Sheet 3
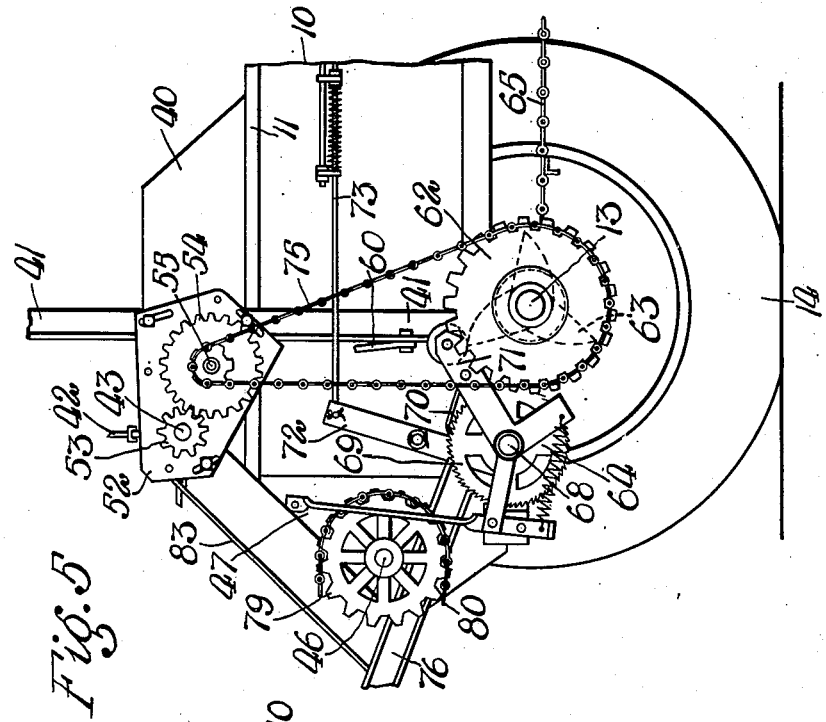
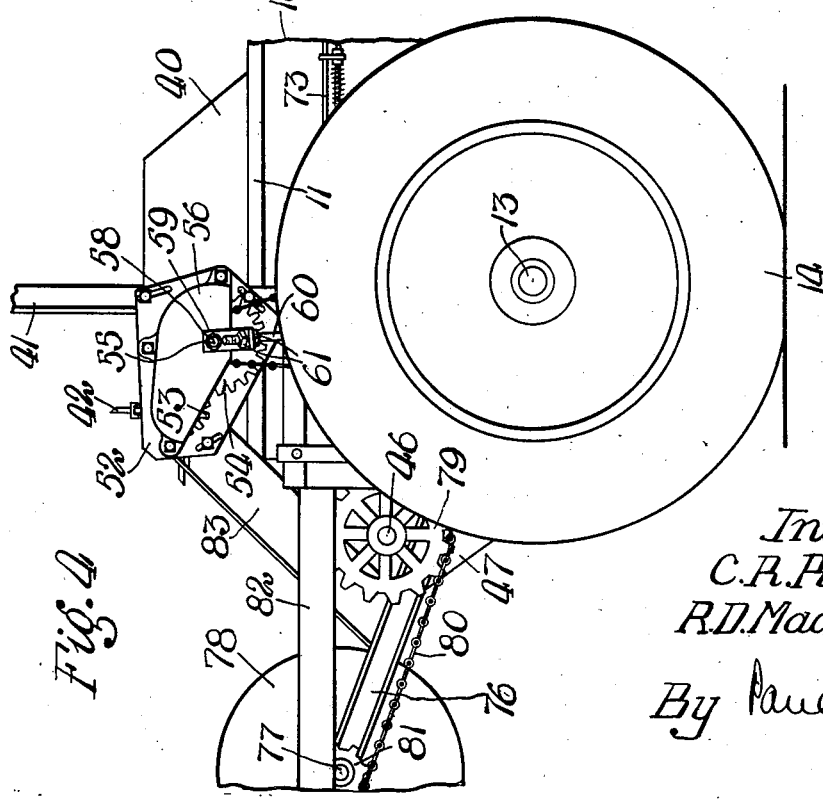
Inventors
C. R. Raney
R. D. MacDonald
By Paul O. Pippel
Atty.

Patented Sept. 23, 1941

2,256,815

UNITED STATES PATENT OFFICE 2,256,815

MANURE SPREADER

Clemma R. Raney, Riverside, and Raymore D. MacDonald, Western Springs, Ill., assignors to International Harvester Company, a corporation of New Jersey Application March 2, 1939, Serial No. 259,394

17 Claims. (Cl. 275—6)

This invention relates to a manure spreader and more particularly to a spreader of the type which is adapted to be connected to and drawn by a vehicle having a power shaft thereon.

The invention contemplates particularly the provision of an improved spreader having an apron, beater mechanism and distributing mechanism or wide spread device, all driven from the source of power on the drawing vehicle.

The principal object of the invention is to provide an improved spreader construction and an improved drive mechanism therefor.

An important object is to dispose various portions of the drive mechanism at desirable locations with respect to the spreader body for the purpose of providing an efficient driving mechanism for the spreader resulting in the elimination of cumbersome and complicated driving connections.

Another important object is the disposition of the drive mechanism for the beater at one side of the body and the disposition of the apron driving mechanism at the other side of the body.

And another object is to drive the apron drive mechanism from the beater drive mechanism through appropriate speed reduction means, including reduction gearing carried on an adjustable plate and a drive member carried on the rear axle of the spreader.

And still another object is to provide a housing which substantially encloses and supports the gearing and which is supported by a portion of the spreader body.

A more complete understanding of the objects and desirable features of the invention may be had from the following detailed description taken in conjunction with the accompanying sheets of drawings, in which a preferred form of the invention is illustrated.

In the drawings:

Figure 2 is a side elevational view of the spreader;

Figure 3 is an enlarged cross-sectional view of the gear box, as supported at one side of the spreader body;

Figure 4 is an enlarged view of the rearward portion of the spreader as viewed from the opposite side, showing portions of the drive mechanism;

Figure 5 is a similar view with certain parts removed to show the drive mechanism more in detail; and, Figure 6 is an enlarged cross-sectional view taken through the housing and adjustable plate, showing the mounting of one of the speed reduction gears therein.

Figure 1:
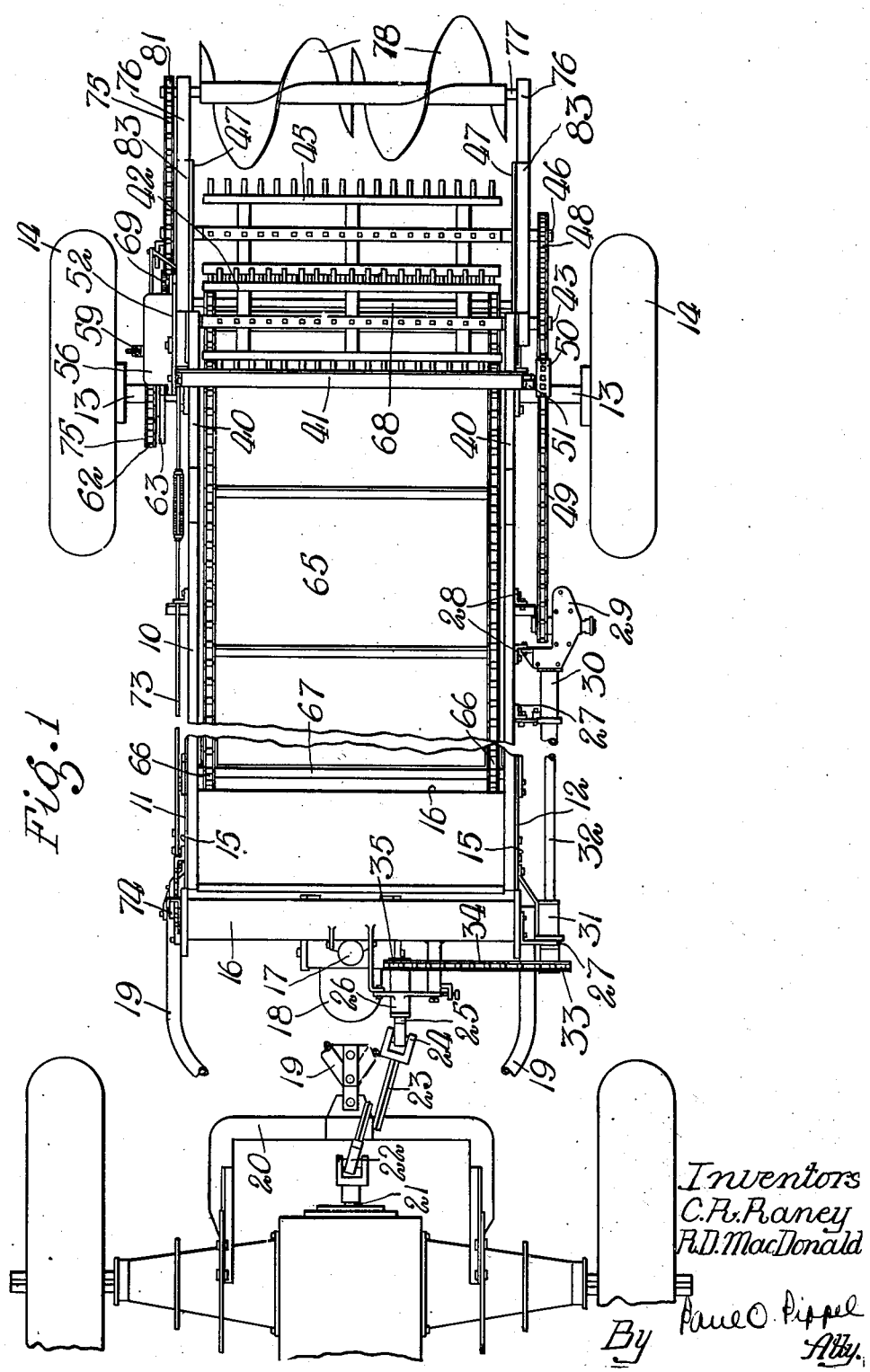
Figure 1 is a plan view of the improved spreader connected to the draw-bar of a tractor, portions of the draft members and tractor power take-off shaft being broken away.

The spreader chosen for the purposes of illustration comprises a longitudinal body 10 having right and left sides 11 and 12, as viewed from a position behind the machine, looking forwardly. The body 10 is carried at its rear on a wheeled axle 13, which extends transversely across the body. The axle is supported in the usual manner by wheels 14. Each side of the body 10 is provided with a forwardly extending plate 15 between which is secured a transversely extending support 16, which is in turn provided with a vertical standard 17 of a suitable caster wheel 18 which supports the forward end of the spreader body. The forwardly extending plates 15 have pivotally connected thereto forwardly extending draft bars 19, which converge and are connected to a draw-bar 20 of a tractor or similar vehicle.

The tractor is provided with a rearwardly extending power take-off shaft 21 which is connected by a universal joint 22 to a rearwardly and diagonally extending shaft 23. The shaft 23 is suitably connected by a universal joint 24 to a longitudinally extending shaft 25 suitably journaled in a bearing bracket 26 provided on the transverse front support 16.

The left side 12 of the body 10 is provided with longitudinally spaced supporting brackets 27. A pair of vertical, longitudinally spaced angle bars 28 form a second pair of supports and serve rigidly to carry a gear housing 29. A sleeve portion 30 of the housing 29 extends longitudinally forwardly and is connected to the rearward bracket 27. The forward bracket 27 carries a bearing 31, and a longitudinally extending drive shaft 32 is journaled adjacent its forward end in the bearing 31, and its rearward end is rotatably associated with the gear housing 29, through the medium of the sleeve 30. A drive sprocket 33 is keyed on or otherwise carried for rotation with the shaft 32 at its forward end and is in turn connected by a drive chain 34 to a drive sprocket 35 carried for rotation with the short shaft 25, which is driven by the tractor power take-off shaft 21.

As best shown in Figure 3, the sleeve 30 is mounted for rotation with the shaft 32 and is journaled in a portion of the gear housing 29. A bevel gear 36 is carried within the housing 29 for rotation with the shaft 32, in the present instance being formed as an integral part of the sleeve 30. The housing 29 has journaled therein a transverse shaft 37, which has keyed thereto a bevel gear 38 meshing with and driven by the gear 36 on the shaft 32. The housing 29 is spaced transversely from the left side 12 of the spreader body 10 and within this space the shaft 37 carries thereon for rotation therewith a drive sprocket 39. The housing 29 is adapted to contain a sufficient supply of lubricant for proper and efficient operation of the gears 36 and 38.

Each side of the body at its rear is provided with an upwardly extending plate or supporting member 40 suitably supported by an arch member 41 in the form of a U-shaped angle bar. A transverse beater 42 of the conventional type is carried on a shaft 43 supported in the plates or supports 40. The left end of the shaft carries for rotation therewith a sprocket 44. A second transverse beater 45 is carried on a shaft 46 supported by rearward extension portions 47 carried respectively by the body sides 11 and 12. This shaft carries at its left end for rotation therewith a sprocket 48. A driving chain 49 is trained about the drive sprocket 39 carried by the shaft 37, which is supported by the gear housing 29, and about the sprockets 44 and 48 of the beaters 42 and 45, respectively. An idler sprocket 50 engages the chain 49 and is adjustably carried by a member 51 supported at the left side of the body and serving as a chain tightener. From the foregoing description, it will be seen that a drive means has been established between the power take-off shaft 21 of the tractor and the rearwardly disposed beaters 44 and 48, said drive means being disposed in a desirable manner entirely at the left side of the spreader body 10.

A second drive means or portion of the improved driving mechanism is carried entirely at the right side of the body and comprises generally the means for driving other portions of the spreader, presently to be described. The right side of the body 11 carries at its rearward end a mounting plate 52, through which the right hand end of the beater shaft 43 extends. The mounting plate 52 is adjustably associated with the body side 11, being adjustable about the beater shaft 43 as an axis and serving as a chain tightener, as will hereinafter appear. The right hand end of the beater shaft 43, which extends through the plate 52, rigidly carries a gear 53 which meshes with and drives a larger gear 54 carried on a stub shaft 55 disposed parallel to the beater shaft. The inner end of the stub shaft 55 is carried in the plate 52 and the outer end of the shaft is carried in the outer wall of a housing 56 rigidly carried by the plate 52 and substantially enclosing the gears 53 and 54 and a drive sprocket 57 mounted for rotation on the stub shaft with the large gear 54. The sprocket 57 is preferably formed as an integral part of the gear 54. The outer end of the shaft 55 is reduced and extends through the outer wall of the housing 56. The shaft at this end has fitted thereover and secured thereto by a nut 58, a bracket portion 59 of a supporting member 60. The lower end of the member 60 is rigidly carried by the right body side 11 on a portion of the arch 41. A portion of the bracket 59 is bent outwardly and the threaded end of the member 60 passes therethrough, being adjustably secured thereto by a pair of nuts 61. The adjustment at this point is adapted to compensate for movement of the plate 52 about the beater shaft 43 when said plate is adjusted, as will hereinafter more fully appear.

The transverse rear axle 13 may be either journaled in or rigidly carried by the body 10 and the wheels 14 may be either rigidly carried by or journaled on the axle 14, according to the manner in which the axle is carried by the body. For the purposes of the present preferred form of the invention, the relation between the body, axle and wheels is immaterial except for operativeness.

A driving member in the form of a large sprocket 62 is carried on the axle 13 at the right side of the body 10. The manner of mounting the sprocket 62 on the axle 13 depends on the relation between the body, axle and wheels, as set forth above, it being necessary that the sprocket be carried on the axle for rotation independently of the wheels 14. A cam member 63 is also mounted on the axle 13 and is driven by or formed as a part of the sprocket 62. The cam member 63 serves to drive, in the usual manner, step-by-step mechanism 64 which in turn drives an apron or conveyer 65 disposed in the body 10 in a conventional manner, being trained at its forward end about a pair of transversely spaced sprockets 66 carried on a transverse shaft 67, which shaft is supported at the forward end of the body. The rearward end of the apron is trained about a pair of transversely spaced sprockets keyed or otherwise rigidly carried by a transverse shaft 68 supported at adjacent ends by opposite sides of the body 10 at the rear thereof. The shaft 68 extends transversely at the right side of the body and rigidly carries thereon a ratchet wheel 69 driven by a pawl 70 carried by a reciprocating arm 71 in turn driven by the cam member 63 on the axle 13. These members comprise portions of the step-by-step mechanism which serve to drive the apron 65 for moving the material from the forward to the rearward end of the body in the usual manner. The step-by-step mechanism is provided with suitable adjusting means 72 connected by a longitudinally forwardly extending rod 73 disposed at the right side of the body and connected at its forward end to a lever 74 within easy reach of an operator on the tractor or on the forward end of the spreader body. This adjusting means may be of conventional form as illustrated in the patent to Swanson et al. No. 1,963,478, granted June 19, 1934. Movement of the lever 74 and rod 73 serves to regulate the position of the arm 71 with respect to the cam member 63, thus varying the stroke of the pawl 70, which in turn varies, of course, the amount of angular movement. The particular form of adjusting means forms no part of the present invention except in so far as the means aids in the disclosure thereof. The sprocket 62 is driven by a drive chain 75 which is trained about the sprocket 57 carried on the stub shaft 55 and driven through the gearing 53 and 54 from the beater shaft 43. Suitable adjustment for the chain 75 is provided by the adjustable plate 52 and the adjustable supporting member 60.

Each body side rigidly carries a rearwardly extending supporting member 76 suitably interconnected with the rearwardly extending side portions 47, said members at their rearward ends serving to journal a transverse shaft 77 which carries a wide spread device or distributor 78. The right hand end of the beater shaft 46 extends transversely at the right side of the spreader body and rigidly carries thereon a sprocket 79, which, through the medium of a drive chain 80, drives a sprocket 81 carried on the shaft 77 to drive the device 78. The beater shaft 46 is, of course, driven by the drive means at the left side of the body. A suitable chain guard 82 is mounted to cover the upper run of the chain 80. Additional side plate portions 83 are associated respectively with the body side, the upwardly extending side plates 40, the rearwardly extending side portions 47 and the supporting members 76 for the wide spread device 78.

From the foregoing description of the drive for the apron 65 and the wide spread device 78, it will be seen that this drive is located wholly at the right side of the spreader body and includes desirable speed reduction means for transferring the drive from the beater shaft 43, the speed reduction means being adjustable to compensate for adjustment of the drive chain 75, which drives the drive member or large sprocket 62 carried on the spreader axle 13. These features are important parts of the present invention together with the desirable arrangement of the drive means located at the left side of the spreader body and both drive means serve to provide an improved arrangement for attaining the aforesaid objects of the invention. It will be appreciated that only a preferred construction or arrangement has been shown and that numerous modifications and alterations may be made therein without departing from the spirit and scope of the appended claims.

What is claimed is:

1. In a material spreader connected to a tractor having a power shaft, said spreader including a body having a rear axle and wheels thereon, an apron and a beater, the combination with the apron and beater, of drive means therefor connected to the tractor power shaft, said means including drive elements at one side of the body and connected to the beater, and second drive elements at the other side of the body for the apron including a drive member carried on the axle.

2. In a material spreader connected to a tractor having a power shaft, said spreader including a body having a rear axle and wheels thereon and an apron, the combination with the apron, of drive means therefor connected to the tractor power shaft and including a drive member carried on the axle.

3. In a material spreader connected to a tractor having a power shaft, said spreader including a body having a rear axle and wheels thereon, and spreader means associated with the body and including an apron and a transverse beater, the combination with the spreader means, of drive means therefor connected to the tractor power shaft, said drive means including drive elements disposed at one side of the body and connected thereat to the beater, a drive member carried by the axle at the other side of the body and driven by the beater, and step-by-step mechanism for the apron driven by the drive member.

4. In a material spreader having a body including side walls, an apron, a beater element carried on a transverse shaft journaled at the rear of the body in the side walls, a plate member carried by one side wall and journaling the beater shaft, a shaft carried by the plate parallel to the beater shaft, drive means between the two shafts, and a second drive means driven by the second shaft and including step-by-step mechanism for the apron.

5. In a material spreader having a body including side walls and carried on a transverse wheeled axle, an apron, a transverse beater element journaled at the rear of the body in the side walls, a plate member carried by one side wall, a shaft carried by the plate parallel to the beater, drive means between the shaft and beater, and a second drive means including a drive member carried by the axle and step-by-step mechanism for the apron between said first drive means and the apron.

6. In a material spreader having a body including side walls, an apron, a transverse beater element journaled at the rear of the body in the side walls, a plate member carried by one side wall, a shaft carried by the plate parallel to the beater, drive means between the beater and the shaft, and a second drive means driven by the shaft and including step-by-step mechanism for the apron.

7. In a material spreader connected to a tractor having a power shaft, said spreader including a body having a rear axle and wheels thereon, and spreader means associated with the body and including an apron and a transverse beater, the combination with the spreader means of drive means therefor connected to the tractor power shaft, said drive means including drive elements disposed at one side of the body and connected thereat to the beater, a drive member carried by the axle and driven by the beater, and step-by-step mechanism for the apron driven by the drive member.

8. In a material spreader connected to a tractor having a power shaft, said spreader having a transverse wheeled axle and distributing means associated with the body and including an apron, a transverse shaft carried at opposite ends by the body, and a beater element on said shaft, the combination with the distributing means, of a drive means therefor connected to the tractor power shaft, said means including drive elements at one side of the body and connected to the proximate end of the beater shaft, a drive member carried by the axle at the other side of the body, second drive elements at that side of the body connecting the other end of the beater shaft and the drive member in driving relation and including substantially enclosed drive gearing, and step-by-step mechanism for the apron driven by the drive member.

9. In a material spreader connected to a tractor having a power shaft, said spreader having a transverse wheeled axle and distributing means associated with the body and including an apron, a transverse shaft carried at opposite ends by the body, and a beater element on said shaft, the combination with the distributing means of a drive means therefor connected to the tractor power shaft, said means including drive elements at one side of the body connected to the proximate end of the beater shaft, a mounting plate carried at the other side of the body, a stub shaft carried by the plate parallel to the beater shaft, speed reduction gearing between said two shafts, and a step-by-step mechanism for the apron driven by the gearing.

10. In a material spreader connected to a tractor having a power shaft, said spreader having a transverse wheeled axle and distributing means associated with the body and including an apron, a transverse shaft carried at opposite ends by the body, and a beater element on said shaft, the combination with the distributing means, of a drive means therefor connected to the tractor power shaft, said means including drive elements at one side of the body connected to the proximate end of the beater shaft, a mounting plate carried at the other side of the body, a stub shaft carried at one end by the plate parallel to the beater shaft, a support connected to the other end of the stub shaft and associated with the body, speed reduction gearing between said two shafts, and a step-by-step mechanism for the apron driven by the gearing.

11. In a material spreader connected to a tractor having a power shaft, said spreader having a transverse wheeled axle and distributing means associated with the body and including an apron, a transverse shaft carried at opposite ends by the body, and a beater element on the said shaft, the combination with the distributing means, of a drive means therefor connected to the tractor power shaft, said means including a power shaft extending along one side of the body, a drive chain driven by said shaft and connected to the proximate end of the beater shaft, a sprocket carried by the axle at the other side of the body, a stub shaft carried at that side of the body parallel to the beater shaft, driving connections between said two shafts, a drive chain connecting the stub shaft and the sprocket on the axle, and step-by-step means for the apron driven by the sprocket.

12. In a material spreader connected to a tractor having a power shaft, said spreader having a transverse wheeled axle and distributing means associated with the body and including an apron, a transverse shaft carried at opposite ends by the body, and a beater element on said shaft, the combination with the distributing means, of a drive means therefor connected to the tractor power shaft, said means including a power shaft extending along one side of the body, a drive chain driven by said shaft and connected to the proximate end of the beater shaft, a sprocket carried by the axle at the other side of the body, a plate member carried at that side of the body, a stub shaft carried by the plate parallel to the beater shaft, driving connections between said two shafts, a drive chain connecting the stub shaft and the sprocket on the axle, and step-by-step means for the apron driven by the sprocket.

13. In a material spreader connected to a tractor having a power shaft, said spreader having a transverse wheeled axle and distributing means associated with the body and including an apron, a transverse shaft carried at opposite ends by the body, and a beater element on said shaft, the combination with the distributing means, of a drive means therefor connected to the tractor power shaft, said means including a power shaft extending along one side of the body, a drive chain driven by said shaft and connected to the proximate end of the beater shaft, a sprocket carried by the axle at the other side of the body, a plate member carried at that side of the body, a stub shaft carried by the plate parallel to the beater shaft, speed reduction gearing between said two shafts, a housing carried by the plate and supporting the stub shaft, a drive chain driven by the gearing and driving the sprocket on the axle, and step-by-step mechanism for the apron driven by the sprocket.

14. In a material spreader connected to a tractor having a power shaft, said spreader having a body having side walls and carried on a transverse wheeled axle and distributing means associated with the body and including an apron, a transverse shaft carried at opposite ends by the body, and a beater element on said shaft, the combination with the distributing means, of a drive means therefor connected to the tractor power shaft, said means including drive elements at one side wall of the body and connected to the proximate end of the beater shaft, a plate carried by the other side wall, a shaft carried by the plate parallel to the beater shaft, a drive member carried by the axle at said side of the body, second drive elements at that side of the body connecting the other end of the beater shaft and the drive member in driving relation and including substantially enclosed drive gearing between the beater shaft and the parallel shaft, and step-by-step mechanism for the apron driven by the drive member.

15. In a material spreader having a body including side walls, an apron, a transverse beater element journaled at the rear of the body in the side walls, a plate member carried by one side wall in the vicinity of the beater, a support associated with the plate and the body, a shaft carried by the plate parallel to the beater, drive means between the beater and the shaft, step-by-step mechanism for the apron, and drive means between the shaft and the step-by-step mechanism.

16. In a material spreader having a longitudinal body carried on a rear axle and ground wheels, and distributing mechanism at the rear of the body rearwardly of the axle, the combination with the distributing mechanism of a gear box carried at one side of the body forwardly of the axle and containing drive gearing, a sprocket disposed exteriorly of the housing and driven by the gearing therein, an endless drive chain connected to the sprocket and the distributing mechanism, a power shaft disposed longitudinally at the same side of the body as the gear box and chain and extending forwardly from the gear box, and means connecting the power shaft and gearing in driving relation.

17. In a material spreader having a longitudinal body carried on a rear axle and ground wheels, and distributing mechanism at the rear of the body rearwardly of the axle, the combination with the distributing mechanism of a gear box carried at one side of the body forwardly of the axle and containing drive gearing, said box having a portion thereof spaced laterally from the side of the body, a sprocket disposed in the space between the side of the body and the gear box and driven by the gearing therein, an endless drive chain connected to the sprocket and the distributing mechanism and disposed closely alongside the body, a power shaft disposed longitudinally at the same side of the body as the gear box and chain and extending forwardly from the gear box, and means connecting the power shaft and gearing in driving relation.

CLEMMA R. RANEY.
RAYMORE D. MacDONALD.